United States Patent [19]
Anderka et al.
[11] Patent Number: 4,489,333
[45] Date of Patent: Dec. 18, 1984

[54] DEVICE FOR EXCHANGING OBJECTS IN PARTICULAR WRITING INSTRUMENTS

[75] Inventors: Gerold Anderka, Ellerbek; Joachim Brandt, Hamburg; Gerhard DeBlitz, Quickborn; Rolf Martens, Hamburg; Rolf Paschen, Elmshorn; Jurgen Post, Stelle; Bernd Willimczik, Wedel, all of Fed. Rep. of Germany

[73] Assignee: Koh-I-Noor Rapidograph, Inc., Bloomsbury, N.J.

[21] Appl. No.: 508,683

[22] Filed: Jun. 28, 1983

[30] Foreign Application Priority Data

Jul. 15, 1982 [DE] Fed. Rep. of Germany ....... 3226455

[51] Int. Cl.[3] ............................................ G01D 15/00
[52] U.S. Cl. .................................. 346/139 R; 346/29; 33/18 R; 33/1 M
[58] Field of Search ................ 33/18 R, 1 M; 346/29, 346/33, 46, 140 R, 140 A, 139 R; 364/520

[56] References Cited

U.S. PATENT DOCUMENTS

| | | | |
|---|---|---|---|
| 2,674,513 | 4/1954 | Bowditch et al. . | |
| 2,717,820 | 9/1955 | Bowditch . | |
| 2,743,986 | 5/1965 | Bradner . | |
| 4,135,245 | 1/1979 | Kemplin et al. ............ | 346/139 R X |
| 4,288,798 | 9/1981 | Hollmayer . | |
| 4,401,996 | 8/1983 | Shirahata ........................ | 346/139 R |
| 4,417,258 | 11/1983 | Tribolet et al. ................ | 346/139 R |

FOREIGN PATENT DOCUMENTS 3110623 4/1982 Fed. Rep. of Germany .

*Primary Examiner*—Harry N. Haroian
*Attorney, Agent, or Firm*—David H. Semmes; Warren E. Olsen

[57] ABSTRACT

In a device for exchanging objects, in particular writing instruments, two substantially identically embodied holders (5, 5') which are open at one side are provided. These holders are movable relative to one another in a plane extending substantially at right angles to there longitudinal axes (12, 12'). The object to be exchanged is held in a receptacle (20), which in cross section has substantially the shape of a regular, convex n-gon having an uneven number of sides. At each corner of the receptacle (20), there is an element of ferromagnetic material (22, 23, 24), and there is a permanent magnet (6, 6') on the inner face, located opposite the open side, of the receiving area of each holder (5, 5'). The receptacle (20) is positionally fixed in a holder (for instance, 5') by means of the aligned position of an element (23) of ferromagnetic material and of a permanent magnet (6', for example). By means of an approach toward the other holder (5'), the receptacle (20) is rotated, so that the permanent magnet (6) of the other holder (5) enters into an aligned position with one element (24) of ferromagnetic material of the receptacle (20), while the magnetic effect between the receptacle (20) and the one holder (5') is broken (FIG. 8).

14 Claims, 17 Drawing Figures

DEVICE FOR EXCHANGING OBJECTS IN PARTICULAR WRITING INSTRUMENTS

BACKGROUND OF THE INVENTION

1. Field of the Invention

The invention relates to a dêvice for exchanging objects, in particular writing instruments, between two holders embodied substantially alike and open at one side. To effect the transfer of an object by means of the approach of their open sides oriented toward one another, these holders are movable relative to one another in a plane which extends substantially at right angles to their longitudinal axes.

2. Brief Description of the Prior Art

In a known device of this kind (described in German published application, DE-OS No. 29 13 690), a change of writing instruments is to be accomplished in a computer-controlled drawing system. A writing instrument is held in the holder of the drawing head by two leaf springs, disposed opposite one another, with ends lightly gripping the writing instrument and pressing it against a stationary inner face, located opposite the opening in the holder, of the receiving area. The free ends of the leaf springs protrude somewhat in the direction of the transfer of the writing instrument to the holder of the instrument magazine, and the holder in the instrument magazine has two correspondingly embodied springs.

If the writing instrument is held in the holder of that drawing head and the drawing head approaches the instrument magazine, then in this state the free ends of the springs of the holder provided in the instrument magazine are located closer together, because of the absence of one writing instrument, than the free ends of the springs of the holder in the drawing head, which are spread apart by the writing instrument inserted between them. As a result, the free ends of the springs of the instrument magazine come into contact with the outer circumference of the writing instrument, and upon the further approach of the drawing head toward the instrument magazine these free ends are spread apart. As a consequence, they touch the protruding free ends of the springs of the holder in the drawing head and push their way in between these springs and the writing instrument, until they come to engage the writing instrument and thereby withdraw it from the holder of the drawing head upon the reversal of the movement of the drawing head.

When a writing instrument is inserted from the instrument magazine into the drawing head, the springs of the holders function in the same manner as described above, but in this case the springs of the holder of the drawing head push their way in between the springs of the holder of the instrument magazine and the writing instrument.

Although this known device for exchanging writing instruments functions relatively simply and reliably, it has the disadvantage that the position of the writing instrument in the holder of the drawing head is not defined precisely, because it is substantially determined by the characteristics of the two springs, which can vary with use. As a result, it may happen that when exchanging one writing instrument producing a particular line width for another which produces a line of different width, for instance, and attempting with the new instrument to continue a line drawn by the old instrument, the new line having the different width will not be centered precisely with respect to the line segment drawn previously.

SUMMARY OF THE INVENTION

It is the object of the invention to create a device of simple structure for exchanging objects, in particular writing instruments, in which the position of the object in a holder is precisely defined and does not undergo any variation, even with long use.

In order to attain this object, a device of the general type discussed above is embodied in such a manner that the object is held in a receptacle having an uneven number of sides, and in cross section substantially having the shape of a regular, convex n-gon. At each corner, the receptacle has an element of ferromagnetic material or a permanent magnet, all these elements being disposed at the same level. In the receiving area, each holder has on the inner face located opposite its open side either a permanent magnet or an element of ferromagnetic material, disposed on the same level as the elements of ferromagnetic material or permanent magnets on the receptacle. Finally, the receptacle, which is held in a holder by means of the aligned position of an element of ferromagnetic material and a permanent magnet, can be rotated by an integral multiple of half the inside angle of the n-gon upon approaching the other holder as a result of the engagement therewith, and it can be transferred into the other holder by means of the aligned position of an element of ferromagnetic material and a permanent magnet.

In the device according to the invention, the fixation of the object, or of the receptacle containing the object, in a holder is thus effected by means of magnetic force—that is, in a non-wearing manner—so that even after long use the position in which the object is held inside the holder always remains the same. For transfer to the other holder, because of the approach of the two holders toward one another, the receptacle containing the object is rotated about its longitudinal axis in such a manner that the areas which attract one another because of magnetic force are displaced relative to one another, and corresponding areas in the other holder which also attract one another magnetically are brought into an aligned position. That is to say, the receptacle of the other holder is attracted magnetically and is fixed in this holder in a position which is replicable even after a long period of use. As a result of the rotation of the receptacle, the holder originally containing this receptacle no longer holds it by magnetic force, because the rotation has instead effected a magnetic fixation of the receptacle in the other holder. Hence, it is now possible to remove the other holder together with the receptacle from the holder which had originally fixed this receptacle.

In order to keep the receptacle in the holder in a position which is precisely aligned in the axial direction, each holder and the receptacle can have two groups of permanent magnets and of elements of ferromagnetic material disposed spaced apart axially from one another, at uniform distances from one another. As a result, the receptacle in the holder is thus held at two areas located at an axial distance from one another by magnetic force, and the axial alignment of the receptacle is thus assured.

In the receiving area of each holder, at least one guide face for the receptacle may be provided between the groups, so that during the transfer operation this receptacle is put into the desired position in the holder by the guide face.

In addition, the receptacle can be brought into an engagement with the associated holder such that it cannot be shifted in the axial direction. For instance, by an engagement between the guide face and a recess provided on the receptacle. By this means, it is also possible to fix the height of the receptacle relative to the holder in a replicable manner.

In the simplest design of the receptacle, it may in cross section have substantially the shape of a triangle.

In order to attain the rotation of the receptacle in one holder upon approaching the other holder or being approached thereby, at least one portion of the opposing free edge areas of the open sides of the holders may protrude to different extents, beyond the inner face of the receiving area which carries the permanent magnet or the element of ferromagnetic material. As a result, the edge area of the holder not containing the receptacle (which protrudes farther out) comes into contact with the receptacle sooner than the other free edge area (which does not protrude as far) so that a rotation of the receptacle is thereby effected.

With the free edge areas of the open sides of the holders embodied in such a manner, the longitudinal axes of the holders may be located, in the transfer position: on a first straight line extending through the centers of the permanent magnets or elements of ferromagnetic material, provided therein. In order to be moved away from one another, the holders can be movable relative to one another along this line. Upon approaching one another, the holders can be movable relative to one another along a second straight line which extends at an acute angle from the first line, for instance at an angle of 35° to 50° (and preferably from 40° to 45°), and passes through the longitudinal axes of the holders. When the device is embodied in such a manner, the approach of the holders to one another is thus effected along a straight line which is different from the straight line along which the holders are moved apart from one another.

The invention will now be described in detail, referring to the drawings.

DESCRIPTION OF THE PREFERRED EMBODIMENT

Figure 1:
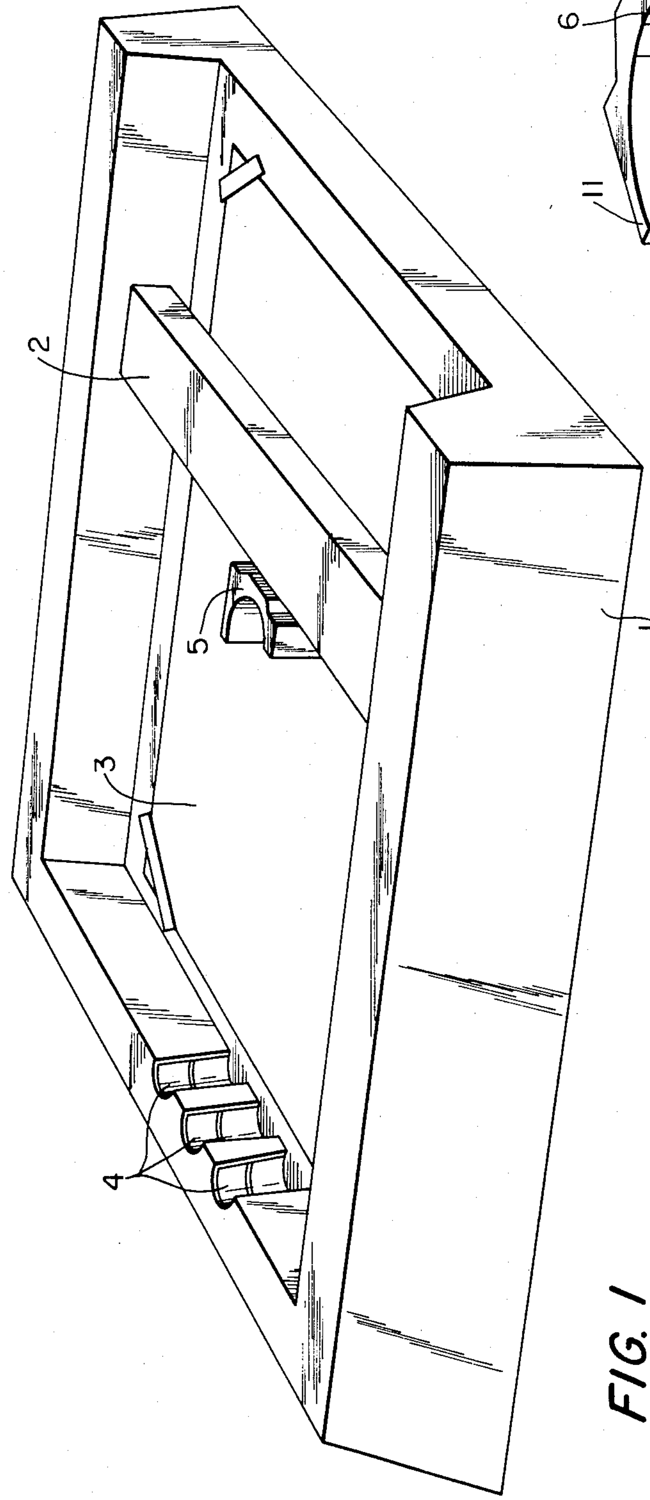
FIG. 1, in a simplified perspective view, shows a plotter in which a holder of a device for exchanging writing instruments may be seen.

The invention will be described herein in terms of a device for exchanging writing instruments, such as may be used in the conventional flat bed plotter 1 shown in FIG. 1, which has a bar 2 that can be moved back and forth in one direction over the drawing surface 3, and a holder 5 secured to bar 2 by means of a drawing head, not shown. The drawing head is movable back and forth on the bar 2 in the longitudinal direction thereof in the conventional manner. Magazines 4 for writing instruments are also present on the stationary frame of the plotter 1, and are shown in a highly simplified and schematic manner. Holders not shown, but corresponding to the holder 5, are secured in these instrument magazines 4.

Figure 2:
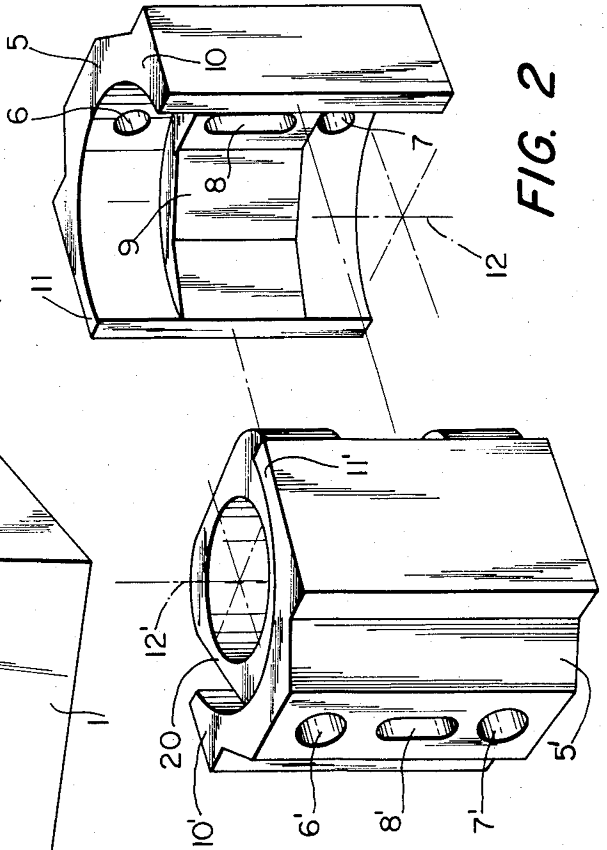
FIG. 2, in perspective views, shows two holders, one of which holds the writing instrument receptacle.

Two holders 5, 5' of identical design are shown in FIG. 2, each in the approximate shape of half a cylindrical shell, the holders facing one another with their open sides. The various parts of the two holders are identified with the same reference numerals, but those of one holder, which will later be assumed to be the stationary holder, are marked with a prime ('). Because the design of the two holders is the same, it will be sufficient to describe only one holder in detail.

Figure 5:
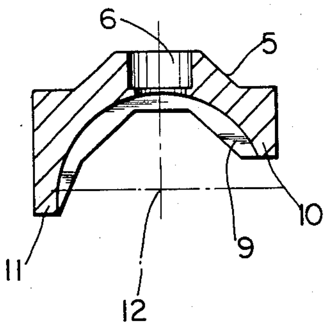
FIG. 5 is a section taken along the line V—V of FIG. 3.

The holder 5, which by way of example is of plastic or non-ferromagnetic metal, has two permanent magnets 6, 7 on its inner face located opposite the open side. The permanent magnets 6, 7 are located on a straight line, extending parallel to the longitudinal axis and are spaced apart axially from one another. Between these permanent magnets, upon the inner face is a protruding guide face 9, and an oblong slot 8 which is provided on a connecting line drawn between the permanent magnets 6 and 7, in the vicinity of the guide face. The holder can be secured on some component of the exchanging device, for instance on the bar 2 or on an instrument magazine 4 of the plotter (FIG. 1), by means of this oblong slot 8. As is shown more particularly in FIG. 2 and 5, one lateral limiting wall of the receiving area of the holder 5 is longer than the other lateral limiting wall, so that free edge area 11 is more remote from the permanent magnets 6, 7 than is free edge area 10. In the assembled state, the longer lateral wall area of one holder (for instance holder 5), is located with its free edge area 11 opposite the shorter wall area of the other holder (for instance holder 5')—that is, opposite the free edge area 10' (FIG. 2)—so that when the holders 5, 5' have made their full approach toward one another and are fully in alignment, they approximately form a ring.

Figure 6:
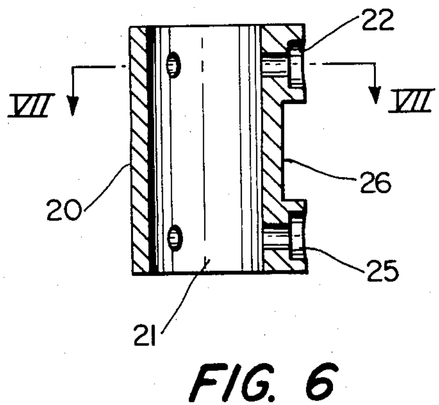
FIG. 6 is a vertical section taken through the writing instrument receptacle of FIG. 2.
Figure 7:
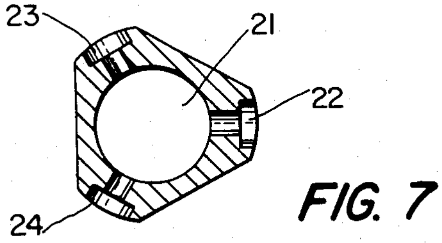
FIG. 7 is a section taken along the line VII—VII of FIG. 6.

In FIG. 2, a receptacle 20 is held in the holder 5' and has a substantially triangular cross section with rounded corners (FIG. 7). A central bore 21 extends through this receptacle 20 along its longitudinal axis. When the receptacle 20 is positioned in one of the holders, its longitudinal axis coincides with that of the holder, for instance the longitudinal axis 12' of the holder 5' in FIG. 2. The central bore 21 serves to receive the objects which are to be exchanged for one another and is therefore adapted in its shape and size to the shape and size of the objects. Elements 22, 23, 24 of ferromagnetic material are provided on each corner of the receptacle 20 in a common radial plane, and elements of ferromagnetic material having the same shape as the elements 22, 23, 24 are disposed, at a distance from the latter which is equal to the distance between the permanent magnets 6, 7 in the holder 5, on each corner of the receptacle in a second radial plane; of these, only the element 25 is shown in FIG. 6.

In the vicinity of each corner, a groove extending in the circumferential direction is embodied between the elements of ferromagnetic material spaced apart axially from one another. In FIG. 6 only the groove 26 is shown, located between the elements 22 and 25. The size of these grooves in the direction of the longitudinal axis of the receptacle 20 corresponds to the length of the guide face 9 of the holder 5 in the direction of the longitudinal axis 12. Hence, when the receptacle 20 is inserted in the holder 5, the guide face 9 engages this groove and reliably prevents a shift in position of the receptacle inside the holder in the direction of the longitudinal axis 12.

The receptacle 20, like the holder 5, may be fabricated of plastic or of non-ferromagnetic metal.

Figure 3:
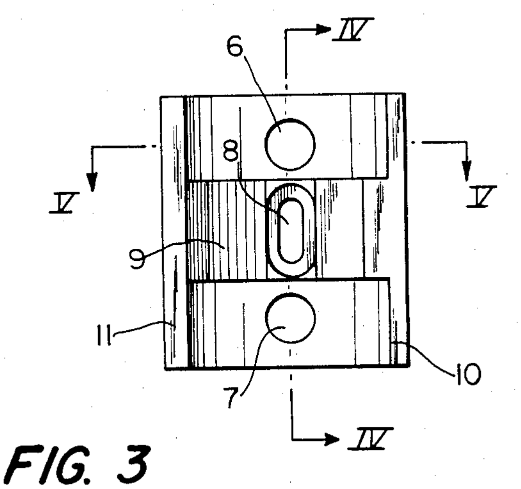
FIG. 3 is a different view of one of the holders of FIG. 2.
Figure 4:
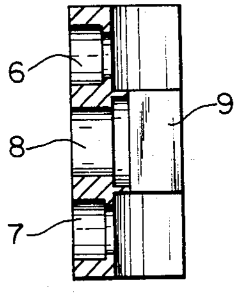
FIG. 4 is a section taken along the line IV—IV of FIG. 3.
Figure 8:
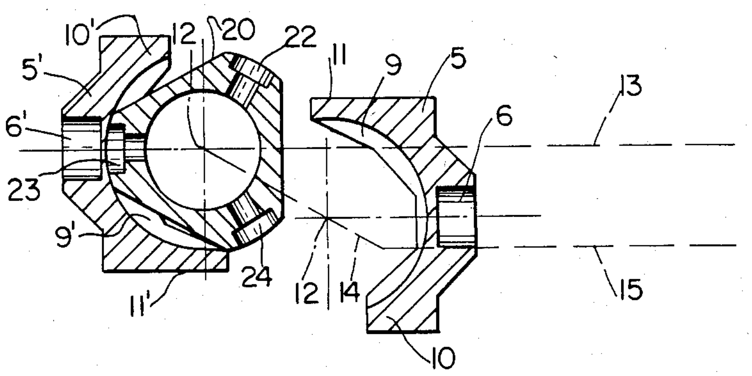
FIGS. 8-12 shows the positions of a holder in sequence in the course of the removal of the receptacle from a stationary holder.

If the position of the holders 5, 5' and of the receptacle 20 as shown in FIG. 2 is taken as the point of departure, then the resultant sectional illustration (extending in the same plane as section V—V of FIG. 3 taken through the holder 5 and section VII—VII of FIG. 6 taken through the receptacle) is shown in FIG. 8. In FIG. 8 the receptacle 20 is seated within the holder 5', and the guide face 9' extends within the corresponding groove of receptacle 20, which is provided in the corner area between the ferromagnetic material element 23 and the ferromagnetic material element provided some distance beneath it. In this position, the central axis of the permanent magnet 6' is located on the central axis of the element of ferromagnetic material 23, so that these two elements attract one another by magnetic force. A permanent magnet 7' (not shown in FIG. 8), attracts an adjacent element of ferromagnetic material of the receptacle 20 in the same manner. The central axis of the receptacle 20 is located in the central axis 12' of the holder 5'. The holder 5 is located at a distance from the holder 5' and offset laterally somewhat therefrom. Its central axis 12 is located on a straight line 14, which extends through the central axis 12' of the holder 5'. Straight line 14 is shown intersecting the straight line 13, which passes through the centers of the permanent magnet 6' and of the element 23 of ferromagnetic material as well as through the central axis 12', at an acute angle of approximately 41.

Figure 9:
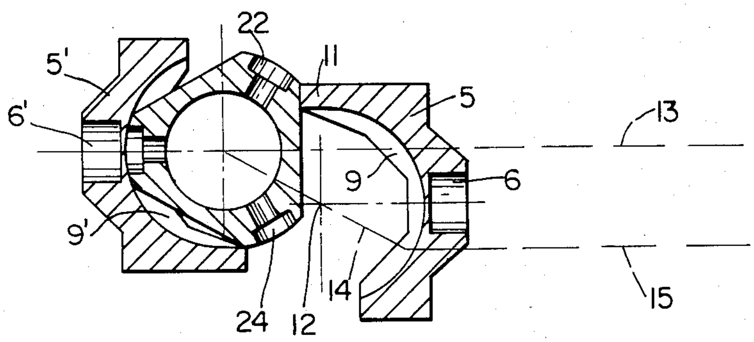
Figure 10:
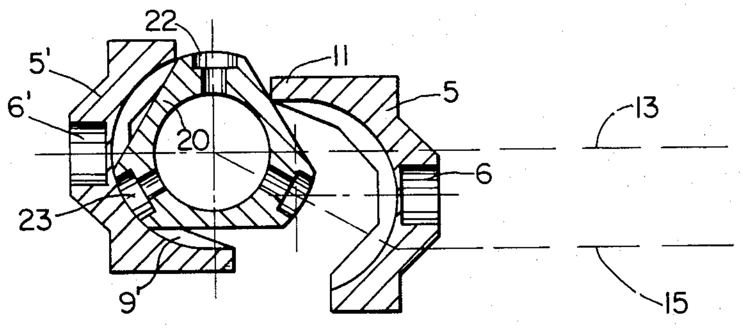

In order to effect transfer of the receptacle 20 from the holder 5' to the holder 5, the holder 5 is moved out of the position shown in FIG. 8, in which the open sides of the holders 5, 5' are oriented toward one another, toward the holder 5' in the plane of the drawing without tilting or twisting in such a manner that the central axis 12 of the holder moves along the line 14. As a result of this approach, the free edge area 11 of the holder 5 comes into contact with the corner of the receptacle 20 in which the element 22 of ferromagnetic material is located (FIG. 9). Further, upon approaching still closer, the free edge area 11 rotates the receptacle 20 counterclockwise in the holder 5 (FIG. 10). During this rotation, the guide face 9' remains in engagement with the groove between the element 23 and the element of ferromagnetic material located below it. Hence, an axial shifting of the receptacle is not possible, although the element 23 of ferromagnetic material is moved out of the vicinity of the permanent magnet 6' and the element of ferromagnetic material located below this element 23 is correspondingly moved out of the vicinity of the permanent magnet 7' and the holder is thereby raised as a result of magnetic force. Once the holder 5 has approached the holder 5' to its closest extent, and the axis 12 of the holder 5 and the axis 12' of the holder 5' to its closest extent, and the axis 12 of the holder 5 and the axis 12' of the holder 5' coincide (FIG. 11), then the receptacle 20 has been rotated to such an extent that the ferromagnetic elements 22 and 23 of the receptacle 20 are at a great distance from the permanent magnet 6', while the element 24 of ferromagnetic material is in alignment with the permanent magnet 6 of the holder 5. Thus, the element of ferromagnetic material located below the element 24 is also in alignment with the permanent magnet 7, and the receptacle 20 is thus attracted by the permanent magnets 6 and 7. The axial positioning of the receptacle 20 is thereby effected, in the same manner as with the movement and the restraint of the receptacle 20 in the holder 5', by means of the engagement of the guide face 9 with the groove provided between the element 24 and the element of ferromagnetic material located below it.

Figure 11:
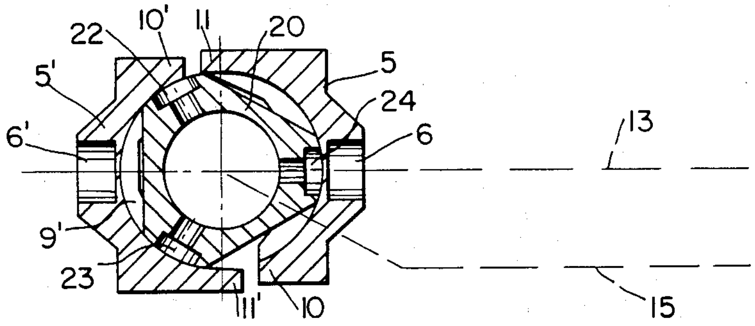
Figure 12:
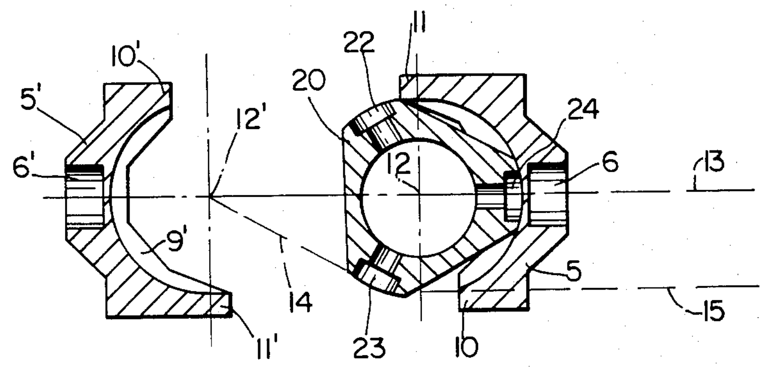

Since in the position shown in FIG. 11 the receptacle 20 is thus held by the holder 5 by magnetic force, yet there is no longer any magnetic force existing between the receptacle 20 and the holder 5', it is possible to remove the receptacle 20 from the holder 5' by moving the holder 5 with its longitudinal axis 12 along the straight line 13, and the receptacle 20 can then be moved away together with the holder 5 (FIG. 12).

Figure 13:
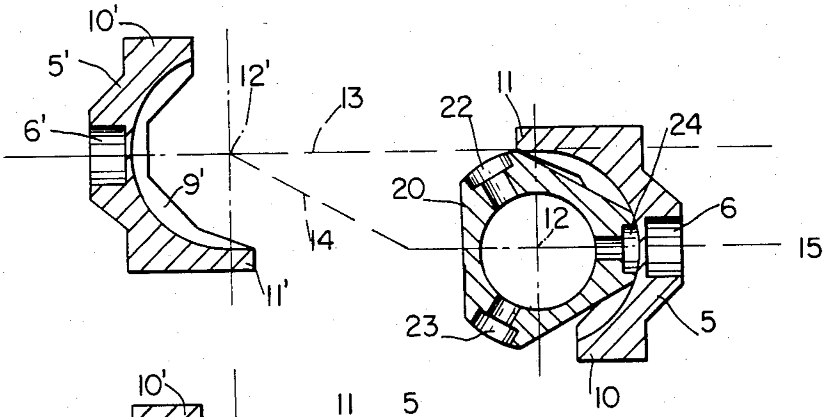
FIGS. 13-17 show the positions of a holder in sequence in the course of the transfer of the receptacle from this holder to the stationary holder.
Figure 14:
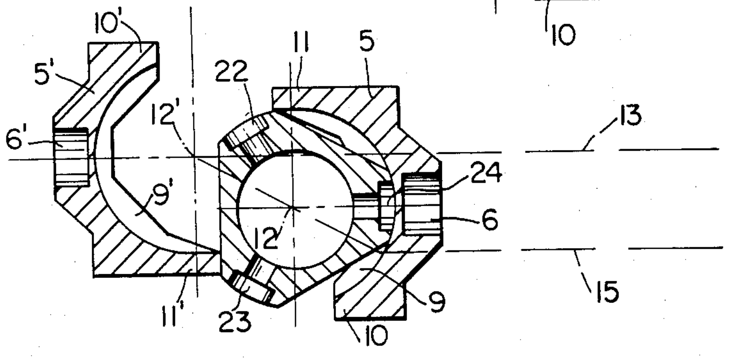
Figure 15:
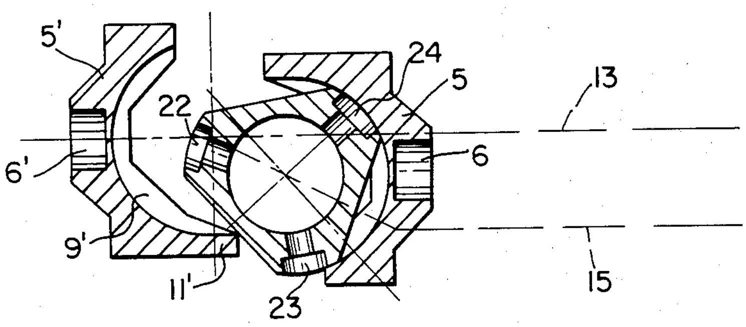
Figure 16:
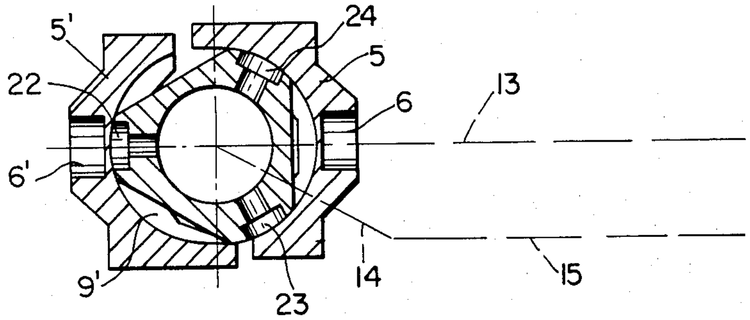
Figure 17:
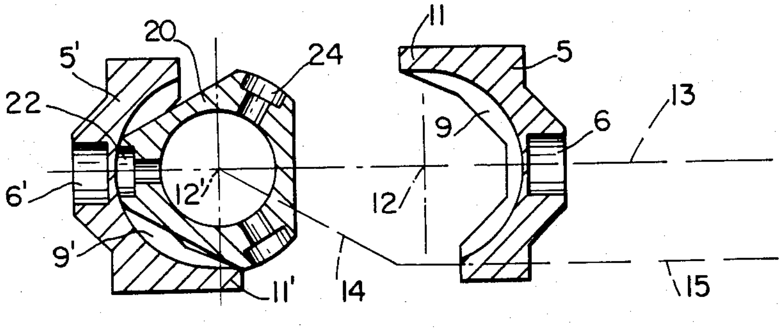

Should it be desired to transfer the receptacle 20 from the movable holder 5 to the stationary holder 5', the holder 5 is shifted parallel to the straight line 13. Thereby, central axis 12 of movable holders is located on a straight line 15 extending parallel to the straight line 13 (FIG. 13). Subsequently, an approaching movement of the holder 5 toward the holder 5' takes place, in which the central axis 12 of the holder 5 is moved along the straight line 14 (FIG. 14), as in the case of the approach movement described earlier. The result is that the free edge area 11' of the holder 5' comes into contact with the receptacle 20 having the element 23 of ferromagnetic material. If this approach movement is continued, and as a result of this engagement, a counterclockwise rotation of the receptacle 20 inside the holder 5 occurs. Consequently, the element 24 of ferromagnetic material moves clear of the permanent magnet 6 and the element of ferromagnetic material located below the element 24 moves clear of the permanent magnet 7 (FIG. 15). This approaching movement ends when the longitudinal axis 12 of the holder 5 coincides with the longitudinal axis 12' of the holder 5' (FIG. 16). In this position, the element 22 of ferromagnetic material and the permanent magnet 6' (like the element 25 of ferromagnetic material 25 and the permanent magnet 7'), are located opposite one another, while no restraining magnetic force remains between the receptacle 20 and the holder 5. In this position for receptacle 20, the holder 5 can thus be removed from the holder 5' by moving it with its longitudinal axis 12 along the line 13, and the receptacle 20 will be held in the holder 5' by magnetic force (FIG. 17).

In the above description, it has been assumed that permanent magnets are provided in the holders, while elements of ferromagnetic material are provided in the receptacles. Naturally it is also possible to replace the permanent magnets in the holders with elements of ferromagnetic material instead and then to replace the elements of ferromagnetic material in the receptacle with permanent magnets. The only criterion is that with a corresponding, aligned positions of the permanent magnet and the element of ferromagnetic material, a magnetic force should be exerted between the holder and the receptacle which keeps these parts together.

While a preferred embodiment of the invention has been shown and described, the invention is to be limited solely by the scope of the appended claims.

We claim:

1. A device for exchanging objects, in particular writing instruments, between two substantially identically embodied holders open at one side, which for the transfer of an object are movable relative to one another, by means of the approach toward one another of their open sides oriented toward one another, in a plane extending substantially at right angles to their longitudinal axes, characterized in that the object is held in a receptacle (20) having an uneven number of corners and in cross section having substantially the shape of a regular, convex n-gon, which has at each corner an element of ferromagnetic material or a permanent magnet, all of which are located at the same level; that each holder has in the receiving area on the inner face disposed opposite its open side a permanent magnet or an element of ferromagnetic material which are disposed on the same level as the elements of ferromagnetic material or permanent magnets, respectively, on the receptacle; and that the receptacle held in a holder by means of the aligned position of an element of ferromagnetic material and a permanent magnet can, upon approaching the other holder; be rotated by means of engagement with the other holder by an integral multiple of half the inside angle of the n-gon and for transfer can be moved into the other holder by means of the aligned position of one element of ferromagnetic material and one permanent magnet.

2. A device as defined by claim 1, characterized in that each holder and the receptacle each have two groups, disposed spaced apart axially from one another, of permanent magnets and elements, respectively, the groups being disposed at the same distances from one another.

3. A device as defined by claim 2, characterized in that at least one guide face for the receptacle is provided in the receiving area of each holder between each group.

4. A device as defined by claim 3, characterized in that the receptacle can be brought into an engagement with the associated holder which engagement cannot be shifted in the axial direction.

5. A device as defined by claim 1, characterized in that the n-gon is a triangle.

6. A device as defined by claim 2, characterized in that the n-gon is a triangle.

7. A device as defined by claim 3, characterized in that the n-gon is a triangle.

8. A device as defined by the claim 4, characterized in that the n-gon is a triangle.

9. A device as defined by claim 1, characterized in that at least one partial area of the free edge areas opposing one another on the open sides of the holders protrudes to a different extent beyond the inner face of the receiving area carrying the permanent magnet or the element of ferromagnetic material.

10. A device as defined by claim 2, characterized in that at least one partial area of the free edge areas opposing one another on the open sides of the holders protrudes to a different extent beyond the inner face of the receiving area carrying the permanent magnet or the element of ferromagnetic material.

11. A device as defined by claim 3, characterized in that at least one partial area of the free edge areas opposing one another on the open sides of the holders protrudes to a different extent beyond the inner face of the receiving area carrying the permanent magnet or the element of ferromagnetic material.

12. A device as defined by claim 4, characterized in that at least one partial area of the free edge areas opposing one another on the open sides of the holders protrudes to a different extent beyond the inner face of the receiving area carrying the permanent magnet or the element of ferromagnetic material.

13. A device as defined by claim 5, characterized in that at least one partial area of the free edge areas opposing one another on the open sides of the holders protrudes to a different extent beyond the inner face of the receiving area carrying the permanent magnet or the element of ferromagnetic material.

14. A device as defined by claim 6, characterized in that the longitudinal axes of the holders, in the transfer position, are located on a straight line extending through the centers of the permanent magnets or elements of ferromagnetic material provided in them and the holders, to be moved away from one another, are movable relative to one another along this line, and that the holders when approaching one another are movable relative to one another along a straight line extending at an acute angle from the first straight line and extending through the longitudinal axes of the holders.

* * * * *